United States Patent
Yan et al.

(10) Patent No.: US 12,218,886 B2
(45) Date of Patent: Feb. 4, 2025

(54) WIRELESS SYSTEM WIDER BANDWIDTH CARRIER INDICATION

(71) Applicant: LENOVO (BEIJING) LIMITED, Beijing (CN)

(72) Inventors: Zhi Yan, Beijing (CN); Haipeng Lei, Beijing (CN); Lianhai Wu, Beijing (CN); Jie Shi, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 340 days.

(21) Appl. No.: 17/624,695

(22) PCT Filed: Jul. 5, 2019

(86) PCT No.: PCT/CN2019/094880
§ 371 (c)(1),
(2) Date: Jan. 4, 2022

(87) PCT Pub. No.: WO2021/003604
PCT Pub. Date: Jan. 14, 2021

(65) Prior Publication Data
US 2022/0278814 A1  Sep. 1, 2022

(51) Int. Cl.
| | |
|---|---|
| *H04L 5/00* | (2006.01) |
| *H04W 72/04* | (2023.01) |
| *H04W 72/0453* | (2023.01) |
| *H04W 72/23* | (2023.01) |

(52) U.S. Cl.
CPC ....... *H04L 5/0098* (2013.01); *H04W 72/0453* (2013.01); *H04W 72/23* (2023.01)

(58) Field of Classification Search
CPC .. H04W 72/23; H04W 72/0453; H04L 5/0098
See application file for complete search history.

(56) References Cited

U.S. PATENT DOCUMENTS

| | | | | |
|---|---|---|---|---|
| 2010/0220674 A1* | 9/2010 | Fu | .......... | H04L 5/0007 370/329 |
| 2019/0349775 A1* | 11/2019 | Sui | .......... | H04W 16/14 |
| 2020/0187256 A1* | 6/2020 | Lim | .......... | H04L 5/0048 |
| 2020/0281003 A1* | 9/2020 | Luo | .......... | H04L 5/0094 |

FOREIGN PATENT DOCUMENTS

| | | |
|---|---|---|
| CN | 107666709 A | 2/2018 |
| CN | 107846710 A | 3/2018 |
| WO | 2018190620 A1 | 10/2018 |

OTHER PUBLICATIONS

International Searching Authority, "Written Opinion of the International Searching Authority," PCT/CN2019/094880, Mar. 23, 2020, pp. 1-4.
Ericsson, MIB, SIBs and Paging for NB-IoT TDD, 3GPP TSG-RAN WG2 #101, R2-1803012, 26th Feb.-Mar. 2, 2018, pp. 1-8, Athens, Greece.

* cited by examiner

*Primary Examiner* — Maharishi V Khirodhar
*Assistant Examiner* — Kenneth P Hunt
(74) *Attorney, Agent, or Firm* — Kunzler Bean & Adamson

(57) ABSTRACT

Methods and apparatuses for indicating carrier are disclosed. A method comprises transmitting a candidate carrier configuration, wherein the candidate carrier configuration includes at least one of a frequency position, a frequency offset, an operation mode, NRS information, CRS information, power offset and EUTRA system bandwidth of at least one candidate carrier.

20 Claims, 6 Drawing Sheets

WIRELESS SYSTEM WIDER BANDWIDTH CARRIER INDICATION

FIELD

The subject matter disclosed herein generally relates to wireless communications, and more particularly relates to indicating carrier.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Next Generation Node B (gNB), Orthogonal Frequency Division Multiplexing (OFDM), Radio Resource Control (RRC), Reference Signal (RS), Single Carrier Frequency Division Multiple Access (SC-FDMA), Time-Division Duplex (TDD), Time Division Multiplex (TDM), User Entity/Equipment (Mobile Terminal) (UE), Uplink (UL), Universal Mobile Telecommunications System (UMTS), Worldwide Interoperability for Microwave Access (WiMAX), Internet-of-Things (IoT), Narrowband Internet-of-Things (NB-IoT or NBIoT), Long Term Evolution (LTE), Narrowband (NB), Narrowband Primary Synchronization Signal (NPSS), Narrowband Secondary Synchronization Signal (NSSS), Narrowband Physical Broadcast Channel (NPBCH or NB-PBCH), System Information (SI), System Information Block (SIB), System Information Block Type1-NB (NB-SIB1), Physical Downlink Shared Channel (PDSCH), Physical Uplink Shared Channel (PUSCH), Downlink control information (DCI), Physical Resource Block (PRB), Universal Mobile Telecommunications System (UMTS), Evolved-UMTS Terrestrial Radio Access (E-UTRA or EUTRA).

An anchor carrier is a carrier carrying at least synchronization signal and broadcast signal. In NB-IoT, the anchor carrier is a carrier where the UE assumes that Narrowband Primary Synchronization Signal (NPSS), Narrowband Secondary Synchronization Signal (NSSS) and Narrowband Physical Broadcast Channel (NPBCH) are transmitted, in which NPSS and NSSS are synchronization signals and NPBCH contains broadcast signals. On the other hand, a non-anchor carrier is a carrier where the UE does not assume that NPSS, NSSS and NPBCH are transmitted.

In Rel.14, non-anchor carriers can be configured as paging and random access carriers. The non-anchor carriers can be configured in any frequency carrier without any restriction. For example, the non-anchor carriers are not necessary to be adjacent carriers to anchor carrier. For another example, the non-anchor carriers are configured as independent carriers to anchor carrier with different operation modes, etc.

In Rel.17, non-anchor carriers can be configured to be used for PDSCH and PUSCH transmission. The frequency (position) of the non-anchor carrier is necessary to be indicated to the UE. In addition, there is a requirement to support transmitting data in more than one carrier (which can be either anchor carrier or non-anchor carrier or both), e.g. two carriers or three carriers. Therefore, it is necessary to indicate the positions (frequencies) of multiple carriers to the UE.

BRIEF SUMMARY

Methods and apparatuses for indicating carriers are disclosed.

In one embodiment, a method comprises transmitting a candidate carrier configuration, wherein the candidate carrier configuration includes at least one of a frequency position, a frequency offset, an operation mode, NRS information, CRS information, power offset and EUTRA system bandwidth of at least one candidate carrier.

In one embodiment, each candidate carrier is associated with a frequency index. The method further comprises transmitting a bit map indicator indicating whether each candidate carrier can be used for data transmission or not.

In another embodiment, the one candidate carrier is a reference carrier of a carrier set. The method further comprises transmitting the number of carriers of the carrier set.

In some embodiment, the frequency offset is relative frequency offset to a frequency of an anchor carrier. Moreover, the frequency offset has the unit of a basic resource block. The frequency position may be determined by at least one of the frequency offset, the frequency of the anchor carrier, the number of carriers in the carrier set, the operation mode for the anchor carrier and the EUTRA system bandwidth.

In some embodiment, the candidate carrier is the adjacent carriers to the anchor carrier. The method further comprises transmitting the number of carriers adjacent to the anchor carrier of each side. Alternatively, the number of carriers adjacent to the anchor carrier of each side is 1 or 2.

In one embodiment, a base unit comprises a transmitter that transmits a candidate carrier configuration, wherein the candidate carrier configuration includes at least one of a frequency position, a frequency offset, an operation mode, NRS information, CRS information, power offset and EUTRA system bandwidth of at least one candidate carrier.

In another embodiment, a method comprises receiving a candidate carrier configuration, wherein the candidate carrier configuration includes at least one of a frequency position, a frequency offset, an operation mode, NRS information, CRS information, power offset and EUTRA system bandwidth of at least one candidate carrier.

In yet another embodiment, a remote unit comprises a receiver that receives a candidate carrier configuration, wherein the candidate carrier configuration includes at least one of a frequency position, a frequency offset, an operation mode, NRS information, CRS information, power offset and EUTRA system bandwidth of at least one candidate carrier.

BRIEF DESCRIPTION OF THE DRAWINGS

A more particular description of the embodiments briefly described above will be rendered by reference to specific embodiments that are illustrated in the appended drawings.

Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
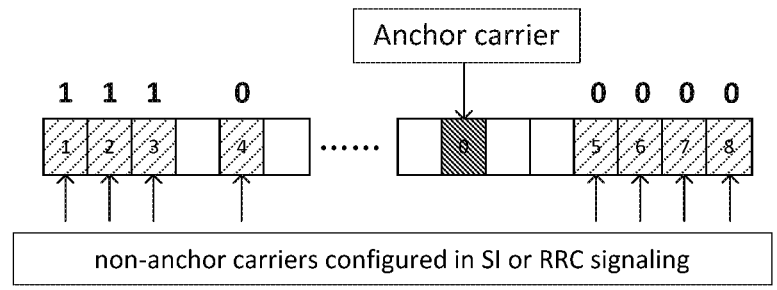
FIG. 1 is a schematic diagram illustrating carrier indication according to a first implementation and a second implementation of a first embodiment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

In the first embodiment, non-anchor carriers to be used for data transmission, i.e. used for PDSCH and PUSCH transmission, are indicated to the UE. Basically, there are two alternative ways of indicating non-anchor carriers to the UE. The first way is to firstly indicate all of potential non-anchor carriers to the UE before indicating actually-used non-anchor carriers to the UE. For example, all of potential non-anchor carriers may be indicated by SI (System Information) while actually-used non-anchor carriers may be indicated by RRC signaling. Alternatively, all of potential non-anchor carriers may be indicated by RRC signaling while actually-used non-anchor carriers may be indicated by DCI. The second way is to indicate actually-used non-anchor carriers directly to the UE. For example, actually-used non-anchor carriers may be indicated by RRC signaling.

In the first embodiment, each non-anchor carrier is associated with a candidate carrier configuration. At least one of the following parameters may be included in the candidate carrier configuration: frequency position, operation mode, NRS information, CRS information, and power offset to an anchor carrier.

For example, a carrier of NB-IoT occupies 180 KHz. The frequency position may be the lowest frequency and the highest frequency of the carrier, or the center frequency of the carrier (i.e. the middle frequency between the lowest frequency and the highest frequency). For example, suppose a non-anchor carrier occupies frequencies from 6982.5 KHz to 7162.5 KHz, a frequency position of the non-anchor carrier may be represented as "the lowest frequency 6982.5 KHz and the highest frequency 7162.5 KHz", or as "the center frequency 7072.5 KHz". The frequency position may alternatively be represented as a frequency index, such as defined in RAN4. For example: frequency index 0 may refer to a frequency range: 6982.5 KHz to 7162.5 KHz; frequency index 1 may refer to a frequency range: 6000 KHz to 6180 KHz.

Three operation modes are supported for NB-IoT: standalone, guard-band and in-band. In the in-band operation mode, one physical resource block in a LTE carrier is used as the NB-IoT carrier. In the guard-band operation mode, the resource blocks that are used for edge protection bands of the LTE are used as NB-IoT carriers. In the standalone operation mode, a refarming GSM band with a width of 180 KHz is used as the NB-IoT carrier. UE has different behaviors in different operation modes. For example, UE in in-band mode should puncture the CRS resource element for PDSCH resource mapping. So for the non-anchor carrier PDSCH and PUSCH transmission, operation mode of non-anchor carrier is preferably indicated to the UE.

NRS (NB-IoT RS) is the reference signal used in NB-IoT. The NRS information may include NRS frequency position information with NB-IoT carrier and NRS sequence information. Both the NRS frequency position information and NRS sequence information are determined by "cell ID" of the NB-IoT carrier, even for the non-anchor carrier. The NRS information is optionally but preferably included in the candidate carrier configuration. If no NRS information is included in candidate carrier configuration, some restriction should be made that the UE may assume the NRS frequency position and NRS sequence can be the same as those of anchor carrier.

CRS is the reference signal used for LTE. The CRS information may include CRS frequency position within the PRB and CRS sequence information. The CRS frequency position within PRB is determined by the cell ID of LTE and the CRS sequence is determined by the CRS frequency position within LTE system band and the cell ID of LTE. When the LTE and NB-IoT are deployed in in-band, the cell ID of the NB-IoT can be deployed the same as cell ID of LTE. If the cell ID of NB-IoT is the same as that of LTE, the LTE CRS can be used together with the NRS for assisting channel estimation and measurement, which will improve the channel estimation performance. The CRS information is optionally but preferably included in the candidate carrier configuration.

As described above, the operation mode is necessary to be identified when indicating the NRS information and the CRS information. If the operation mode of candidate carrier is not in-band, CRS information is not included in the candidate carrier configuration.

Because the anchor carrier power is already indicated by higher layer signaling. The power of the non-anchor carrier can be indicated as the power offset to the anchor carrier. The power offset to the anchor carrier is optionally included in the candidate carrier configuration as the UE may assume that the power of the non-anchor carrier is the same as the power of the anchor carrier.

According to a first implementation of the first embodiment, potential non-anchor carriers are configured by SI, for example, configured in SIB 1. In addition, actually-used non-anchor carriers are configured by RRC signaling.

SI is broadcast message that can be received by all of UEs in a cell while RRC signaling can be UE-specific, i.e., only received by a specific UE.

When configuring the potential non-anchor carriers, each candidate carrier configuration may be associated with an frequency index. Accordingly, when RRC signaling configures the actually-used non-anchor carriers, the frequency index can be used to represent whether the corresponding candidate carrier is used (by other UEs) or not. The frequency index can be implemented as a bit map. For example, if 8 carriers are configured by SI, a 8-bit bit map indicator can be used to indicate the UE which carriers are used and which carriers are not used. A bit "0" may be used for indicating that the corresponding carrier is used by UE(s) while "1" is used for indicating that the corresponding carrier is not used by any UE(s). For example, "01001111" may represent that the first, the third and the fourth corresponding carriers are used while the second, the fifth, the sixth, the seventh and the eighth corresponding carriers are not used. As shown in FIG. 1, SI configures eight non-anchor carriers with frequency indices 1-8. RRC signaling may indicate to a specific UE a bit map "11100000" indicator to represent that carriers with indices 1-3 are not-used carriers, i.e. the non-anchor carriers that can be used by the specific UE. These non-anchor carriers with indices 1-3 may be used by the specific UE for PDSCH and/or PUSCH transmission. According to the first implementation, each non-anchor carrier is separately indicated. Therefore, the non-anchor carriers used for a specific UE may be continuous or discontinuous.

The advantage of the first implementation is that the non-anchor carrier configuration is the similar to Rel.14 non-anchor carrier configuration.

In a second implementation of the first embodiment, UE-specific RRC signaling directly configure the actually-used non-anchor carriers for PDSCH and PUSCH transmission. Still referring to FIG. 1, the RRC signaling may indicate non-anchor carriers with indices 1-3 to a specific UE for PDSCH and PUSCH transmission. Each non-anchor carrier is indicated by its candidate carrier configuration. Similar to the first implementation, according to the second implementation, the non-anchor carriers used for a specific UE may be continuous or discontinuous. According to the second implementation, it is unnecessary for the gNB to use SI to configure potential non-anchor carriers.

According to the first and second implementations, each non-anchor carrier is separately indicated. Therefore, the indicated non-anchor carriers may be continuous or discontinuous. In the condition that the indicated non-anchor carriers are continuous, these continuous non-anchor carriers may be referred to as a carrier set.

According to a third implementation, a carrier set of multiple continuous non-anchor carriers is indicated. In particular, SI configures potential non-anchor carriers. RRC signaling is used to indicate, from the potential non-anchor carriers, a first non-anchor carrier (an example of a reference carrier) (for example by its frequency index) of a carrier set and further indicate the continuous number of the carriers contained in the carrier set. Incidentally, the continuous number of the carriers may depend on UR RF bandwidth capability. For example, the UE RF bandwidth capability is 600 KHz, the maximal continuous number of the carriers can be 3, as the bandwidth of 3 carriers is 540 KHz which is smaller than 600 KHz.

Figure 2:
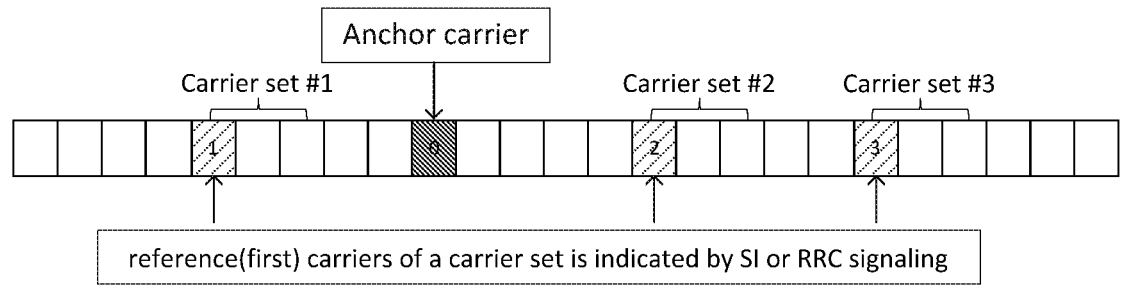
FIG. 2 is a schematic diagram illustrating carrier indication according to a third implementation of the first embodiment.

FIG. 2 illustrates the third implementation of the first embodiment. SI configures carriers with indices 1-3 as potential non-anchor carriers. RRC signaling may indicate from the potential non-anchor carriers 1-3 that a specific potential non-anchor carrier (such as carrier #1) is the first non-anchor carrier (an example of a reference carrier) of a carrier set, and further indicate the number of carriers is 3 for the carrier set staring with the specific potential non-anchor carrier (carrier #1). Therefore, the carrier set #1 consisting of 3 carriers with the first carrier being the carrier #1 is configured.

In the above description, the first non-anchor carrier of the carrier set is indicated as the reference carrier of the carrier set. Alternatively, any non-anchor carrier in the carrier set may be indicated as the reference carrier. For example, the last carrier in the carrier set, or the middle carrier in the carrier set in case the carrier set consists of three carriers may be indicated as the reference carrier.

According to the third implementation of the first embodiment, it is flexible to configure the bandwidth (i.e. the number of non-anchor carriers) by RRC signaling for different UE capabilities.

Incidentally, the reference carrier of a carrier set and the continuous number of the carriers contained in the carrier set may be directly indicated by RRC signaling without indicating potential non-anchor carriers by SI.

According to a fourth implementation of the first embodiment, a carrier set of multiple continuous non-anchor carriers is indicated. Different from the third implementation, in the fourth implementation, the carrier set is configured directly by SI or RRC signaling.

Figure 3:
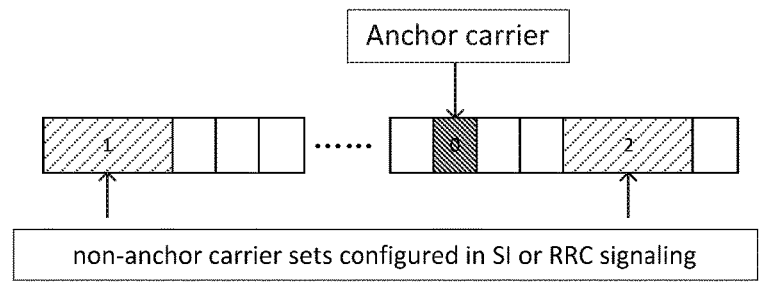
FIG. 3 is a schematic diagram illustrating carrier indication according to a fourth implementation of the first embodiment.

As illustrated in FIG. 3, a carrier set is directly indicated by SI or RRC signaling. Each carrier set may be associated with a candidate carrier configuration. The number of non-anchor carriers included in a carrier set may be predetermined. For example, a carrier set may include 3 non-anchor carriers by default.

According to the first embodiment, the non-anchor carrier configuration is complicated because each potential non-anchor carrier (or carrier set in the fourth implementation) has a candidate carrier configuration containing at least one of the parameters. For example, the operation mode may be indicated for each potential non-anchor carrier separately. In case of PDSCH transmission in the operation mode of in-band, it is always beneficial to use CRS for channel estimation. Therefore, CRS information has to be included in the non-anchor carrier configuration for each potential non-anchor carriers for operation mode of in-band.

The UE is always able to identify the anchor carrier. In other words, the frequency position of the anchor carrier is derived by the UE after initial access. Therefore, it is advantageous to configure the potential non-anchor carrier frequency positions by referring to the frequency position of the anchor carrier.

A second embodiment for indicating carrier frequency is described, in which the frequency position of the anchor carrier is considered. It is enough to indicate a non-anchor carrier by indicating an frequency offset to the frequency position of the anchor carrier.

According to a first implementation of the second embodiment, only adjacent carriers to anchor carrier may be configured as potential non-anchor carriers. The number of adjacent non-anchor carriers on either side of the anchor carrier is respectively indicated by RRC signaling.

Figure 4:
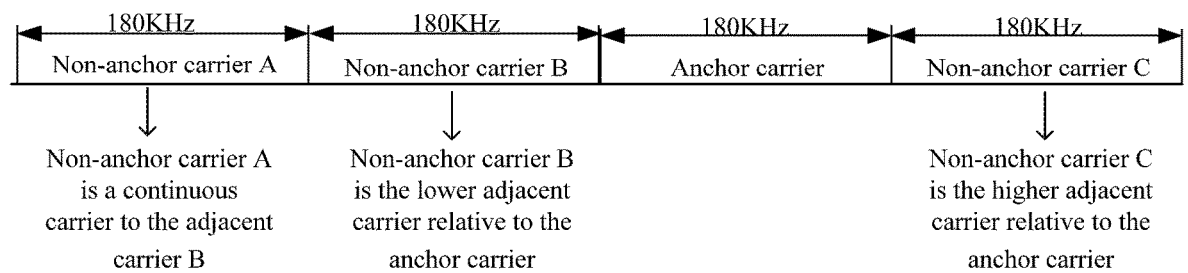
FIG. 4 is a schematic diagram illustrating carrier indication according to a first implementation of a second embodiment.

FIG. 4 illustrates an example of the first implementation of the second embodiment in an operation mode of in-band. Non-anchor carrier B is the lower adjacent carrier relative to the anchor carrier. Non-anchor carrier C is the higher adjacent carrier relative to the anchor carrier. Non-anchor carrier A is a continuous carrier to the adjacent carrier B. Both carriers A and B may be regarded as adjacent non-anchor carriers on lower side of the anchor carrier. The RRC signaling indicates to the UE that the number of potential non-anchor carriers on lower side of the anchor carrier is 2 and the number of potential non-anchor carriers on higher side of the anchor carrier is 1. In this condition, the carriers A, B and C and the anchor carrier compose a carrier set with bandwidth of 180×4=720 KHz.

By default, both the number of potential non-anchor carriers on lower side of the anchor carrier and the number of potential non-anchor carriers on higher side of the anchor carrier are respectively set to 1. In FIG. 4, carriers B and C are default potential non-anchor carriers. In this condition, the carriers B and C and the anchor carrier compose a carrier set with bandwidth of 540 KHz, where the center frequency of the carrier set is still the center frequency of the anchor carrier. In other words, there is no need to retune the center frequency for wider bandwidth transmission.

According to the first implementation of the second embodiment, all of potential or actually-used non-anchor carriers are adjacent to the anchor carrier. It can assume that the channel quality of the non-anchor carriers is the same as the anchor carrier. There it is no need for additional measurement for non-anchor carrier. In the second embodiment, the frequency position of the non-anchor carrier is determined by a frequency offset to the anchor carrier. In the first implementation of the second embodiment, the frequency offset is represented by the number of continuous non-anchor carriers on either side (lower side and higher side) of the anchor carrier.

FIG. 4 show an example in which the operation mode is in-band for the anchor carrier. In the condition that the operation mode is guard-band for the anchor carrier, more configurations are necessary.

Figure 5:
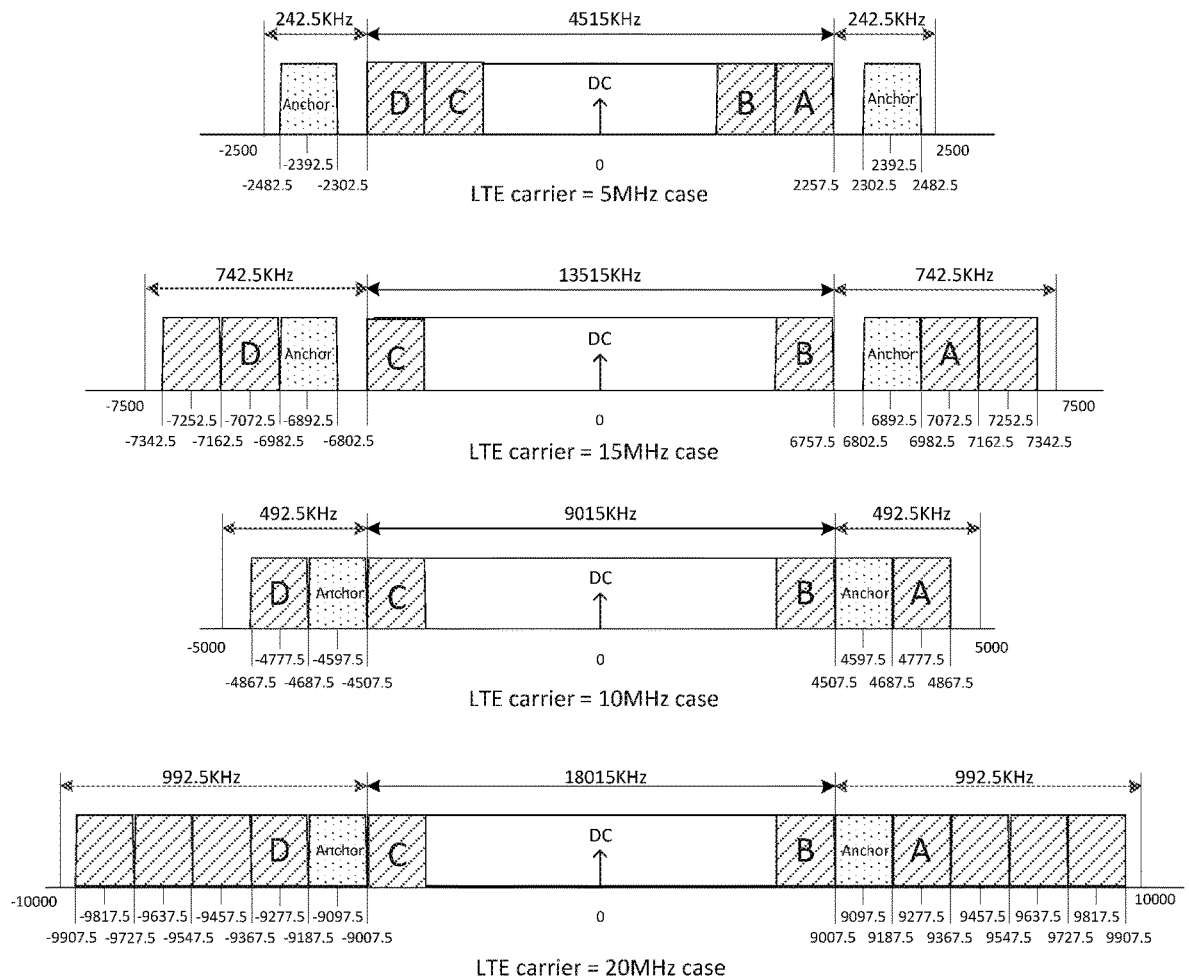
FIG. 5 depicts an example of NB-IoT anchor carrier deployment for the guard-band.

FIG. 5 depicts an example of NB-IoT anchor carrier deployment for the guard-band. The guard-band NB-IoT deployment may be different for different operators or vendors. The band(s), especially the detailed numbers of the frequencies shown in FIG. 5, are only for examples.

As shown in FIG. 5, for 10 MHz and 20 MHz LTE system bandwidths, anchor carriers are potentially placed on the first PRB in the guard-band, counting from the edge of the in-band. In consideration of the 100 KHz channel raster requirement, there is only one potential anchor carrier available for each side of guard-band.

The 100 KHz channel raster requirement means that the center frequency of the anchor carrier should be a multiple of 100 KHz. In the guard-band operation mode, the center frequency of the anchor carrier CANNOT be exactly a multiple of 100 KHz. Instead, an offset of the center frequency of the anchor carrier from the channel raster of 100 KHz may be present. The offset is at most 7.5 KHz according to the NB-IoT standard. Practically, the offset is 2.5 KHz or 7.5 KHz.

As an example, for the 10 MHz LTE system bandwidth, there are two carriers in the guard-band at each side of the in-band. The center frequencies are respectively 4597.5 KHz and 4777.5 KHz or −4597.5 KHz and −4777.5 KHz to LTE carrier center (e.g. assuming LTE carrier center is 0 Hz). Based on the above-described center frequency of the anchor carrier meeting the 100 KHz channel raster requirement in view of the maximum offset of 7.5 KHz, only the carriers with the center frequencies of 4597.5 KHz and −4597.5 KHz to LTE carrier center may be used as potential anchor carriers. The other two carriers with the center frequencies of 4777.5 KHz and −4777.5 KHz may be used as potential non-anchor carriers. Incidentally, the carriers inside the in-band may also be used as potential non-anchor carriers.

Similarly, for the 20 MHz LTE system bandwidth, only the carriers with center frequencies 9097.5 KHz and −9097.5 KHz are eligible as potential anchor carriers. The other eight carriers in the guard-band may be used as potential non-anchor carriers.

For 15 MHz and 5 MHz LTE system bandwidths, in order to meet the requirement of 100 KHz channel raster requirement, 3 empty subcarriers (each has a bandwidth of 15 KHz) should be added between the in-band PRB grid and the guard-band PRB grid as a gap. There is only one potential anchor carrier available for each side of the guard-band. For the 15 MHz LTE system bandwidth, the available potential anchor carriers have the center frequencies of 6892.5 KHz and −6892.5 KHz. For the 5 MHz LTE system bandwidth, the available potential anchor carriers have the center frequencies of 2392.5 KHz and −2392.5 KHz. The other carriers in the guard-band are potential non-anchor carriers. Note that for 5 MHz LTE system bandwidth, since the only one carrier in either guard-band is the anchor carrier, no potential non-anchor carriers are present in the guard-band.

The SI or RRC signaling may further indicate the EUTRA system bandwidth (e.g. 5 MHz, 10 MHz, 15 MHz or 20 MHz).

If the EUTRA system bandwidth is 5 MHz, the frequency position of non-anchor carrier (carrier A and D) to anchor carrier is determined as 180 KHz+45 KHz=225 KHz, if the frequency offset is 1 PRB and the gap is 45 KHz due to EUTRA system bandwidth of 5 MHz. The frequency position of non carrier (carrier B and C) to anchor carrier is determined as 225 KHz+180 KHz=405 KHz, if the frequency offset is 2PRBs.

If the EUTRA system bandwidth is 15 MHz, the frequency position of non-anchor carrier in the in-band (carriers B and C) to anchor carrier is determined as 180 KHz+45 KHz=225 KHz if the frequency offset is 1 PRB and the gap is 45 KHz due to EUTRA system bandwidth of 15 MHz. The frequency position of non-anchor carrier in the guard-band (carriers A and D) to anchor carrier is determined as 180 KHz if the frequency offset is 1 PRB and there is no gap.

If the EUTRA system bandwidth is 10 MHz, the frequency position of non-anchor carrier in the in-band and in the guard-band (carriers A, B, C and D) to anchor carrier is determined as 180 KHz if the frequency offset is 1 PRB and there is no gap.

If the EUTRA system bandwidth is 20 MHz, the frequency position of non-anchor carrier in the in-band and in the guard-band (carriers A, B, C and D) to anchor carrier is determined as 180 KHz if the frequency offset is 1 PRB and there is no gap.

Assuming a carrier set is composed of 3 carriers (1 anchor carrier and 2 non-anchor carriers), according to different EUTRA system bandwidths, the composition and bandwidth of the carrier set are different.

If the EUTRA system bandwidth is 5 MHz, a carrier set may consist of the anchor carrier and lower side non-anchor carriers A and B, with a total bandwidth of 180 KHz+180 KHz+225 KHz=585 KHz.

If the EUTRA system bandwidth is 15 MHz, a carrier set may consist of the anchor carrier and higher side non-anchor carrier A and lower side non-anchor carrier B, with a total bandwidth of 180 KHz+225 KHz+180 KHz=585 KHz.

If the EUTRA system bandwidth is 10 MHz, a carrier set may consist of the anchor carrier and higher side non-anchor carrier A and lower side non-anchor carrier B, with a total bandwidth of 180 KHz+180 KHz+180 KHz=540 KHz.

If the EUTRA system bandwidth is 20 MHz, a carrier set may consist of the anchor carrier and higher side non-anchor carrier A and lower side non-anchor carrier B, with a total bandwidth of 180 KHz+180 KHz+180 KHz=540 KHz.

According to a second implementation of the second embodiment, the potential non-anchor carriers do not have to be adjacent carriers to the anchor carrier. A carrier set consisting of multiple continuous non-anchor carriers is indicated. In particular, a frequency offset of the first non-anchor carrier of the carrier set to the anchor carrier may be indicated by SI or RRC with units of PRB. In addition, the number of continuous carriers contained in the carrier set may be further indicated.

Figure 6:
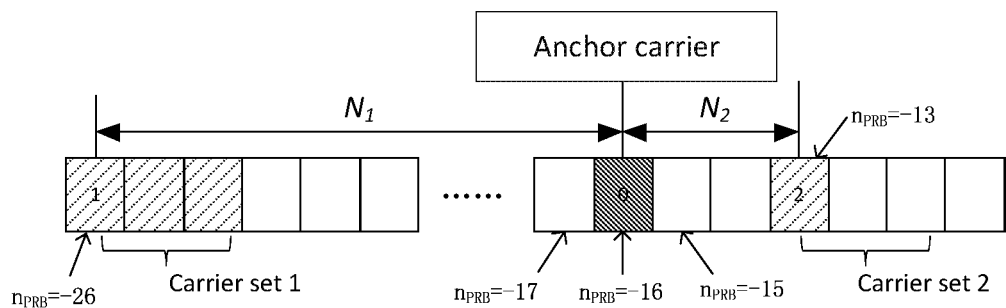
FIG. 6 is a schematic diagram illustrating carrier indication according to a second implementation of the second embodiment.

FIG. 6 illustrates an example of the second implementation of the second embodiment. RRC signaling may indicate the frequency offset of the non-anchor carrier 1 to the anchor carrier is N1 (e.g. N1=−10) in units of PRB, and the number of continuous carriers is 3 (i.e. the carrier set 1 consists of 3 continuous non-anchor carriers). Incidentally, the number of continuous carriers may be preset as a default value such as 3. Therefore, the carrier set 1 consisting of three continuous carriers with the first carrier having an offset of −10 to the anchor carrier is used for PDSCH and/or PUSCH transmissions. In order to reduce the indication overhead of frequency offset, N1 can be defined as N1=N0*K, in which K is the number of carriers for a carrier set, and N0 is an positive or negative integer that satisfies "an absolute value of N0*K is smaller than half of LTE bandwidth".

In the second implementation of the second embodiment, if the PCID of LTE system is the same as that of anchor carrier of NB-IoT, the CRS information for carrier set consisting of the non-anchor carriers can be derived from that cell ID of NB-IoT and anchor carrier frequency position within LTE system. As shown in FIG. 6, the anchor carrier is located at a PRB with a reference $n_{PRB}=-16$ within LTE carrier. The non-anchor carrier to the left of the anchor carrier is located at a PRB with a reference $n_{PRB}=-17$ within LTE carrier. The non-anchor carrier to the right of the anchor carrier is located at a PRB with a reference $n_{PRB}=-15$ within LTE carrier. Similarly, the non-anchor carrier 1 with a frequency offset of N1=−10 is located at a PRB with a reference $n_{PRB}=-26$ within LTE carrier. Therefore, the CRS information for the non-anchor carrier 1 is the CRS information for the PRB with a reference $n_{PRB}=-26$ within LTE carrier.

FIG. 6 also illustrates the offset of the carrier 2 (N2) is 3 (in units of PRB) and the number of continuous carriers contained in the carrier set 2 is also 3. Needless to say, the CRS information for the non-anchor carrier 2 is the CRS information for the PRB with a reference $n_{PRB}=-13$ within LTE carrier.

In the second implementation of the second embodiment, in order to ensure that the carrier sets consisting of potential non-anchor carriers do not overlap, the minimum interval between adjacent offsets shall be equal to or larger than the number of continuous carriers contained in the carrier set.

Incidentally, in the second implementation of the second embodiment, the first carrier of the carrier set is indicated as a reference carrier. Alternatively, any carrier of the carrier set can be indicated as the reference carrier.

According to a third implementation of the second embodiment, the offset of a carrier set of multiple continuous non-anchor carriers is indicated directly by SI or RRC signaling with units of PRB.

By default, a carrier set consists of 3 adjacent carriers. The center frequency of the carrier set is the center frequency of the middle carrier in the 3 adjacent carriers. For the standalone and in-band operation mode even for some EUTRA bandwidths in guard-band operation mode, the frequency offset of the non-anchor carrier to the anchor carrier is N*180 KHz, where N is an integer equal to or more than 1.

Figure 7:
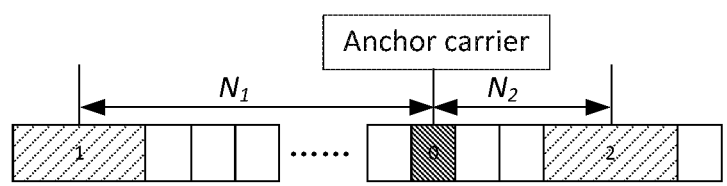
FIG. 7 is a schematic diagram illustrating carrier indication according to a third implementation of the second embodiment.

FIG. 7 illustrates an example of the third implementation of the second embodiment. In FIG. 7, the carrier set 1 and the carrier set 2 have the same compositions as those shown in FIG. 6. However, the center frequency of the carrier set 1 in FIG. 7 is the same as the second carrier contained in the carrier set 1 in FIG. 6. Therefore, the offset of the carrier set 1 to the anchor carrier is N1 (e.g. N1=−9) in units of PRB. Similarly, the offset of the carrier set 2 to the anchor carrier is N2 (e.g. N2=4) in units of PRB.

In FIGS. 6 and 7, all of carriers are shown to be adjacent to each other. In the condition that the anchor carrier and/or non-anchor carriers are in the guard-band, 3 empty subcarriers (with a total bandwidth of 45 KHz) may be present between the last in-band carrier and the first guard-band carrier (for example, see carrier A and the anchor carrier in the 5 MHz case of FIG. 5). As this 45 KHz gap is predetermined (only present in the EUTRA system bandwidths of 5 MHz or 15 MHz), the UE can identify the 45 KHz gap if it is indicated of the EUTRA system bandwidth. In a word, the frequency position is determined by at least one of a frequency offset, a frequency of an anchor carrier, the number of carriers in the carrier set, the operation mode for the anchor carrier and the EUTRA system bandwidth.

In the second embodiment, a frequency offset to the frequency of the anchor carrier is used to indicate the non-anchor carrier. Therefore, the frequency offset is included in the candidate carrier configuration. The frequency position is determined at least based on the frequency offset. As described above, when the operation mode for the anchor carrier is guard-band, the frequency position is calculated in view of the EUTRA system bandwidth.

Figure 8:
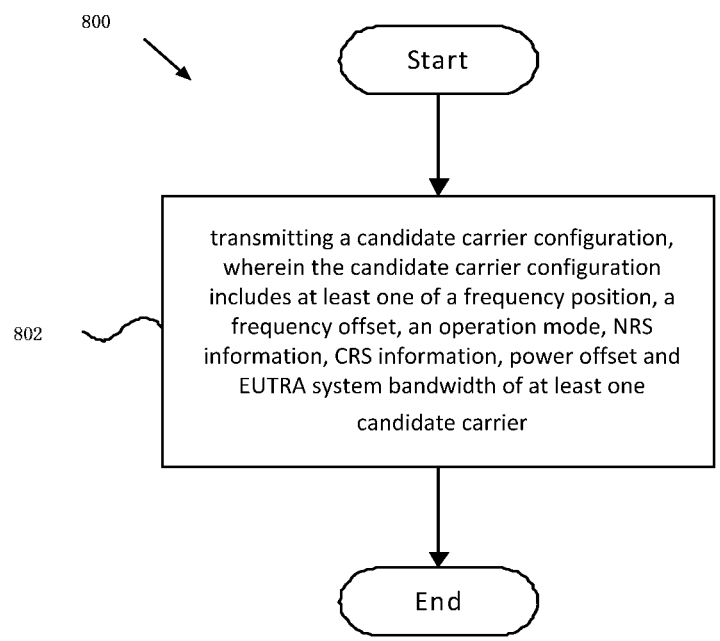
FIG. 8 is a schematic flow chart diagram illustrating an embodiment of a method for indicating carrier.

FIG. 8 is a schematic flow chart diagram illustrating an embodiment of a method 800 for indicating carrier. In some embodiments, the method 800 is performed by an apparatus, such as a base unit. In certain embodiments, the method 800 may be performed by a processor executing program code, for example, a microcontroller, a microprocessor, a CPU, a GPU, an auxiliary processing unit, a FPGA, or the like.

The method 800 may include 802 transmitting a candidate carrier configuration, wherein the candidate carrier configuration includes at least one of a frequency position, a frequency offset, an operation mode, NRS information, CRS information, power offset and EUTRA system bandwidth of at least one candidate carrier.

Figure 9:
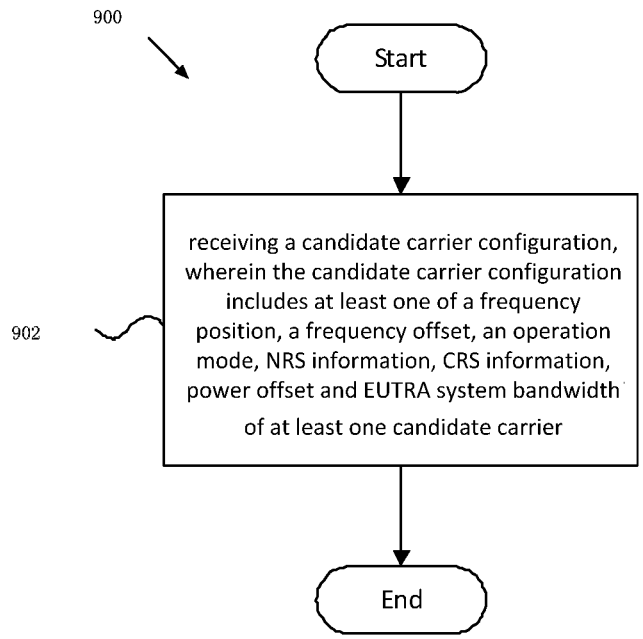
FIG. 9 is a schematic flow chart diagram illustrating a further embodiment of a method for indicating carrier.

FIG. 9 is a schematic flow chart diagram illustrating a further embodiment of a method 900 for indicating carrier. In some embodiments, the method 900 is performed by an apparatus, such as a remote unit. In certain embodiments, the method 900 may be performed by a processor executing program code, for example, a microcontroller, a microprocessor, a CPU, a GPU, an auxiliary processing unit, a FPGA, or the like.

The method 900 may include 902 receiving a candidate carrier configuration, wherein the candidate carrier configuration includes at least one of a frequency position, a frequency offset, an operation mode, NRS information, CRS information, power offset and EUTRA system bandwidth of at least one candidate carrier.

Figure 10:
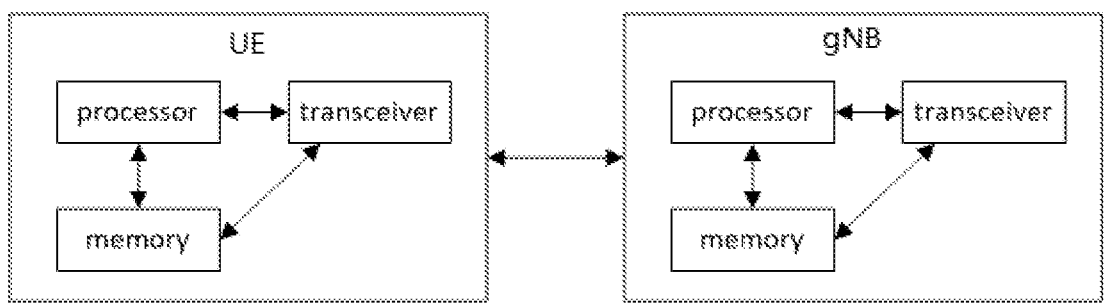
FIG. 10 is a schematic block diagram illustrating apparatuses according to one embodiment.

FIG. 10 is a schematic block diagram illustrating apparatuses according to one embodiment.

Referring to FIG. 10, the UE (i.e. the remote unit) includes a processor, a memory, and a transceiver. The processor implements a function, a process, and/or a method which are proposed in FIG. 9. The gNB (i.e. base unit) includes a processor, a memory, and a transceiver. The processors implement a function, a process, and/or a method which are proposed in FIG. 8. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
   transmitting a candidate carrier configuration that indicates at least one of a frequency position, a frequency offset, an operation mode, narrowband reference signal (NRS) information, cell specific reference signal (CRS) information, a power offset, or an evolved universal mobile telecommunications system terrestrial radio access (EUTRA) system bandwidth of at least one candidate carrier; and
   transmitting an indication of whether a candidate carrier, based on the candidate carrier configuration, can be used for data transmission.

2. A base station comprising:
   at least one memory; and
   at least one processor coupled with the at least one memory and configured to cause the base station to:
      transmit a candidate carrier configuration that indicates at least one of a frequency position, a frequency offset, an operation mode, NRS information, CRS information, a power offset, or an EUTRA system bandwidth of at least one candidate carrier; and
      transmit an indication of whether a candidate carrier, based on the candidate carrier configuration, can be used for data transmission.

3. The base station of claim 2, wherein each candidate carrier is associated with a frequency index, and the indication comprises a bit map indicator.

4. The base station of claim 2, wherein the at least one candidate carrier is a reference carrier of a carrier set.

5. The base station of claim 4, wherein the at least one processor is further configured to cause the base station to transmit a number of carriers of the carrier set.

6. The base station of claim 2, wherein the frequency offset is a relative frequency offset to a frequency of an anchor carrier.

7. The base station of claim 2, wherein the frequency offset has the unit of a basic resource block.

8. The base station of claim 2, wherein the frequency position is determined by the frequency offset, a frequency of an anchor carrier, a number of carriers in a carrier set, the operation mode for the anchor carrier, the EUTRA system bandwidth, or some combination thereof.

9. The base station of claim 8, wherein the candidate carrier is an adjacent carrier to the anchor carrier.

10. The base station of claim 9, wherein the at least one processor is further configured to cause the base station to transmit the number of carriers adjacent to the anchor carrier of each side.

11. The base station of claim 9, wherein the number of carriers adjacent to the anchor carrier of each side is 1 or 2.

12. A user equipment (UE), comprising:
at least one memory; and
at least one processor coupled with the at least one memory and configured to cause the UE to:
receive a candidate carrier configuration that indicates at least one of a frequency position, a frequency offset, an operation mode, NRS information, CRS information, a power offset, or an EUTRA system bandwidth of at least one candidate carrier; and
receive an indication of whether a candidate carrier, based on the candidate carrier configuration, can be used for data transmission.

13. The UE of claim 12, wherein each candidate carrier is associated with a frequency index, and the indicator comprises a bit map indicator.

14. The UE of claim 12, wherein the one candidate carrier is a reference carrier of a carrier set.

15. The UE of claim 14, wherein the at least one processor is further configured to cause the UE to receive a number of carriers of the carrier set.

16. The UE of claim 12, wherein the frequency offset is a relative frequency offset to a frequency of an anchor carrier.

17. The UE of claim 12, wherein the frequency offset has the unit of a basic resource block.

18. The UE of claim 12, wherein the frequency position is determined by the frequency offset, a frequency of an anchor carrier, a number of carriers in a carrier set, the operation mode for the anchor carrier, the EUTRA system bandwidth, or some combination thereof.

19. The UE of claim 18, wherein the candidate carrier is an adjacent carrier to the anchor carrier.

20. The UE of claim 19, wherein the at least one processor is further configured to cause the UE to receive the number of carriers adjacent to the anchor carrier of each side.

* * * * *